United States Patent
Liu et al.

(10) Patent No.: US 11,915,017 B2
(45) Date of Patent: Feb. 27, 2024

(54) METHOD FOR SWITCHING THEME OF APPLICATION AND ELECTRONIC DEVICE

(71) Applicant: BOE TECHNOLOGY GROUP CO., LTD., Beijing (CN)

(72) Inventors: Heng Liu, Beijing (CN); Yingjie Li, Beijing (CN); Liping Lei, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 241 days.

(21) Appl. No.: 17/360,484

(22) Filed: Jun. 28, 2021

(65) Prior Publication Data

US 2021/0405858 A1     Dec. 30, 2021

(30) Foreign Application Priority Data

Jun. 29, 2020 (CN) .................... 202010610012.1

(51) Int. Cl.
G06F 9/451      (2018.01)
G06F 3/0481     (2022.01)

(52) U.S. Cl.
CPC .......... *G06F 9/451* (2018.02); *G06F 3/0481* (2013.01)

(58) Field of Classification Search
CPC .................. G06F 9/451; G06F 3/0481
See application file for complete search history.

(56) References Cited

U.S. PATENT DOCUMENTS

| | | | |
|---|---|---|---|
| 10,534,587 B1 * | 1/2020 | Knudtson | G06F 8/35 |
| 10,964,069 B2 * | 3/2021 | Vadhri Venkata | G06F 8/38 |
| 2005/0193380 A1 * | 9/2005 | Vitanov | G06F 9/451 |
| | | | 717/115 |
| 2008/0295027 A1 * | 11/2008 | Seo | G06F 3/0481 |
| | | | 715/810 |
| 2009/0288023 A1 * | 11/2009 | Hernandez | G06F 9/451 |
| | | | 715/762 |
| 2011/0035552 A1 * | 2/2011 | Heynen | G06F 3/048 |
| | | | 715/765 |
| 2012/0011447 A1 * | 1/2012 | Bennett | G06F 9/451 |
| | | | 715/745 |
| 2013/0031468 A1 * | 1/2013 | Lee | G06F 9/451 |
| | | | 715/236 |
| 2015/0242080 A1 * | 8/2015 | Balmori Labra | H04L 67/025 |
| | | | 715/746 |
| 2016/0274776 A1 * | 9/2016 | Scheff | G06F 9/451 |

* cited by examiner

*Primary Examiner* — Daniel Samwel
(74) *Attorney, Agent, or Firm* — Lippes Mathias LLP

(57) ABSTRACT

Disclosed are a method for switching a theme of an application and an electronic device, which belong to the field of electronic technologies. The electronic device receives a theme switching request for a first application in the electronic device. The theme switching request includes an indication for a target theme. In response to the theme switching request, the electronic device switches a theme of the first application to the target theme, and switches a theme of a second application having an association relationship with the first application in the electronic device to the target theme.

14 Claims, 6 Drawing Sheets

METHOD FOR SWITCHING THEME OF APPLICATION AND ELECTRONIC DEVICE

This application claims priority to the Chinese Patent Application No. 202010610012.1, filed on Jun. 29, 2020 and entitled "METHOD FOR SWITCHING THEME OF APPLICATION PAGE AND RELATED DEVICE," the entire content of which is incorporated herein by reference.

TECHNICAL FIELD

The present disclosure relates to the field of electronic technologies, in particular to a method for switching a theme of an application and an electronic device.

BACKGROUND

Currently, there are more and more types of applications (hereinafter referred to as APPs). Users may set different themes for a single application.

With the continuous development of services, products delivered at present are often a whole set of solutions. The applications in the whole set of solutions are required to maintain a unified style, and corresponding styles need to be displayed in different scenarios, which requires the capability to configure several sets of different themes for switching by the applications during development.

SUMMARY

The present disclosure provides a method for switching a theme of an application and an electronic device.

In one aspect, a method for switching a theme of an application is provided. The method is applicable to an electronic device, and the method includes:

receiving a theme switching request for a first application in the electronic device, wherein the theme switching request includes an indication for a target theme; and switching, in response to the theme switching request, a theme of the first application to the target theme, and a theme of a second application having an association relationship with the first application in the electronic device to the target theme.

Optionally, the second application having the association relationship with the first application satisfies at least one of the following conditions:

attribute information of the second application is related to attribute information of the first application, wherein attribute information of any application is configured to describe characteristics of the any application;

the second application is a preset application associated with the first application; and the second application and the first application satisfy: a pointing relationship from the first application to the second application.

Optionally, the attribute information includes at least one of an identifier, a manufacturer, a content, and a function.

Optionally, receiving the theme switching request for the first application in the electronic device includes: receiving the theme switching request for the first application by the first application;

switching the theme of the first application to the target theme includes: switching the theme of the first application to the target theme by the first application based on the indication for the target theme; and switching the theme of the second application having the association relationship with the first application in the electronic device to the target theme includes: sending a theme switching message to the second application by the first application, wherein the theme switching message includes the indication for the target theme; and switching the theme of the second application to the target theme by the second application based on the indication for the target theme.

Optionally, a first association identifier is configured in the first application, and a second association identifier is configured in the second application;

sending the theme switching message to the second application by the first application includes:

sending the theme switching message by the first application in a broadcast manner, wherein the theme switching message further includes the first association identifier; and switching the theme of the second application to the target theme by the second application based on the indication for the target, theme includes:

switching, in response to the second association identifier matching the first association identifier, the theme of the second application to the target theme by the second application based on the indication for the target theme.

Optionally, the method further includes:

wilting, in response to the theme switching request, the indication for the target theme in a target configuration file by the first application, wherein the target configuration file is shared by the first application and other applications having an association relationship with the first application.

Optionally, after writing the indication for the target theme in the target configuration file by the first application, the method further includes:

reading, in response to a third application having an association relationship with the first application running in the electronic device, the indication for the target theme from the target configuration file by the third application; and switching a theme of the third application to the target their e by the third application based on the indication for the target theme.

Optionally, switching, in response to the theme switching request, the theme of the first application to the target theme, and the theme of the second application having the association relationship with the first application to the target theme includes:

acquiring a target theme color of the target theme based on the indication for the target theme; and switching themes of the first application and the second application based on the target theme color.

Optionally, switching themes of the first application and the second application based on the target theme color includes:

performing the following theme switching process on at least one of the first application and the second application:

determining a theme matching color corresponding to an application page according to a contrast color of the application page of an application, the target theme color, and a preset color offset value corresponding to the application; and switching a theme color of the application page to the theme matching color.

Optionally, the contrast color of the application page is a color occupying the largest display area in a display element on the application page.

Optionally, the display element includes at least one of a text, a picture, a video frame, and an icon.

Optionally, the indication for the target theme includes an acquisition path of a theme resource of the target theme.

Optionally, the theme resource includes at least one of a theme color, a theme background, and a theme pattern.

Optionally, the indication for the target theme includes the acquisition path of the theme resource of the target theme;

switching the theme of the first application to the target theme by the first application based on the indication for the target theme includes:

acquiring the target theme color of the target theme by the first application based on the acquisition path of the theme resource of the target theme, and determining a first theme matching color corresponding to a first application page by the first application according to a contrast color of the first application page of the first application, the target theme color, and a preset first color offset value, and switching a theme color of the first application page to the first theme matching color, wherein the first application page is any application page of the first application, and the contrast color of the first application page is a color occupying the largest display area in a display element on the first application page; and switching the theme of the second application to the target theme by the second application based on the indication for the target theme includes:

acquiring the target theme color of the target theme by the second application based on the acquisition path of the theme resource of the target theme, and determining a second theme matching color corresponding to a second application page by the second application according to a contrast color of the second application page of the second application, the target theme color, and a preset second color offset value, and switching a theme color of the second application page to the second theme matching color, wherein the second application page is any application page of the second application, and the contrast color of the second application page is a color occupying the largest display area in a display element on the second application page;

wherein the display element includes at least one of a text, a picture, a video frame, and an icon.

In another aspect, an electronic device is provided. The electronic device includes a processor and a memory; wherein the memory is configured to store a computer program;

the processor is configured to execute the computer program;

wherein the computer program includes a program instruction for performing the following operations:

receiving a theme switching request for a first application in the electronic device, wherein the theme switching request includes an indication for a target theme; and switching, in response to the theme switching request, a theme of the first application to the target theme, and a theme of a second application having an association relationship with the first application in the electronic device to the target theme.

Optionally, the second application having the association relationship with the first application satisfies at least one of the following conditions:

attribute information of the second application is related to attribute information of the first application, wherein attribute information of any application is configured to describe characteristics of the any application;

the second application is a preset application associated with the first application; and the second application and the first application satisfy: a pointing relationship from the first application to the second application.

Optionally, the computer program specifically includes an instruction for performing the following operations:

receiving the theme switching request for the first application by the first application;

switching, in response to the theme switching request, the theme of the first application to the target theme by the first application based on the indication for the target theme;

sending, in response to the theme switching request, a theme switching message to the second application by the first application, wherein the theme switching message includes the indication for the target theme; and switching the theme of the second application to the target theme by the second application based on the indication for the target theme.

Optionally, the computer program further includes an instruction for performing the following operation:

writing, in response to the theme switching request, the indication for the target theme in a target configuration file by the first application, wherein the target configuration file is shared by the first application and other applications having an association relationship with the first application.

Optionally, the computer program further includes an instruction for performing the following operations:

reading, in response to a third application having an association relationship with the first application running in the electronic device, the indication for the target theme from the target configuration file by the third application; and switching a theme of the third application to the target theme by the third application based on the indication for the target theme.

In yet another aspect, a non-transitory computer-readable storage medium is provided. The storage medium stores an instruction. When the instruction is executed by a processor of an electronic device, the following working process is implemented:

receiving a theme switching request for a first application in the electronic device, wherein the theme switching request includes an indication for a target theme; and switching, in response to the theme switching request, a theme of the first application to the target theme, and a theme of a second application having an association relationship with the first application in the electronic device to the target theme.

DETAILED DESCRIPTION

Figure 1:
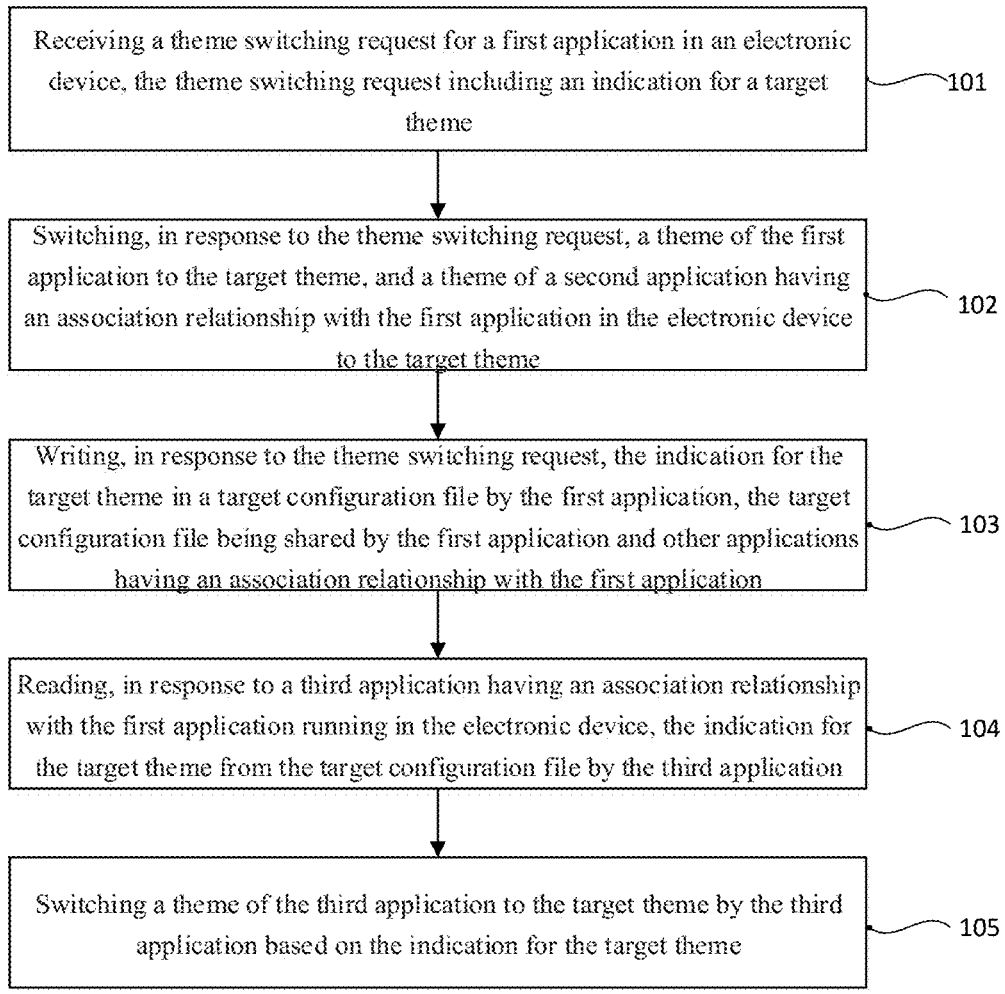
FIG. 1 is a schematic flowchart of a method for switching a theme of an application according to an embodiment of the present disclosure.

For clearer description of the present disclosure, the present disclosure is described in detail below in combination with embodiments of the present disclosure and accompanying drawings. Similar components in the accompanying drawings are denoted by the same reference signs. Those skilled in the art should understand that the content specifically described below is illustrative rather than restrictive, and should not limit the scope of protection of the present disclosure.

In the descriptions of the embodiments of the present disclosure, unless otherwise stated, "/" indicates "or," for example, A/B may indicate A or B. Herein, "and/or" is merely an association relationship describing an associated object, and indicates that there may exist three relationships, for example, A and/or B may indicate three conditions that A exists separately, A and B exist at the same time, and B exists separately.

Hereinafter, terms "first" and "second" are only for the purpose of description and should not be construed as indicating or implying relative importance or implicitly indicating the number of technical features indicated. Thus, the features defined by the terms "first" and "second" may include one or more of the features either explicitly or implicitly. In the descriptions of the embodiments of the present disclosure, unless otherwise stated, the term "plurality" means two or more.

In the embodiments of the present disclosure, the word such as "exemplary" or "for example" is configured to indicate examples, illustrations, or explanations. Any embodiment or design solution described as "exemplary" or "for example" in the embodiments of the present disclosure should not be construed as being more preferable or advantageous than other embodiments or design solutions. To be precise, the word such as "exemplary" or "for example" is configured to present related concepts in a specific manner.

In the related art, when an electronic device receives a theme switching request for a certain application on the electronic device, the electronic device reads a corresponding theme package resource to replace a theme of the application. With the development of services, products delivered at present are often a whole set of solutions, for example, a whole set of applications (a plurality of applications). The whole set of applications need to maintain a unified style, and display the corresponding style in different scenarios at the same time. However, the related art can only perform separate theme replacement on each application in the whole set of applications, and theme replacement of the applications is low in flexibility.

The embodiment of the present disclosure provides a method for switching a theme of an application. After an electronic device receives a theme switching request for a certain application in the electronic device, in response to the theme switching request, the theme of the application and the themes of other applications having an association relationship with the application in the electronic device are switched to a target theme. The theme switching request includes an indication for the target theme. In the present disclosure, by pre-establishing the association relationship among the plurality of applications in the electronic device, when one of the plurality of applications with the association relationship receives the theme switching request, the plurality of applications can be switched to the theme indicated by the theme switching request at the same time. It can be ensured that theme styles of the plurality of applications having the association relationship are consistent without a need for a user or system of the electronic device to perform additional operations. A theme switching operation for only, one application can realize theme switching for the plurality of applications in the same group, which enables the theme replacement to be more convenient and flexible.

For example, FIG. 1 is a schematic flowchart of a method for switching a theme of an application according to an embodiment of the present disclosure. The method is applied to an electronic device. As shown in FIG. 1, the method includes the following working process.

In step 101, a theme switching request for a first application in the electronic device is received, wherein the theme switching request includes an indication for a target theme.

Optionally, the indication for the target theme includes, but not limited to, an acquisition path of a theme resource of the target theme. A theme resource file may be configured in the electronic device. The theme resource file includes the theme resources of a plurality of themes. The plurality of themes may include different color themes, such as a black theme, a blue theme, and the like. The plurality of themes may also include themes of different festivals, such as a theme of the Dragon Boat Festival, a theme of the Mid-Autumn Festival, a theme of the National Day, and the like. The target theme may be any one of the plurality of themes. The acquisition path of the theme resource of the target theme may be a storage location of the theme resource of the target theme in the theme resource file.

Optionally, the theme resource includes at least one of a theme color, a theme background, and a theme pattern.

Optionally, the theme switching request for the first application may be initiated by a user. For example, when the electronic device detects a theme switching operation of the user for the first application, the electronic device determines to receive the theme switching request for the first application. Alternatively, the theme switching request for the first application may also be initiated by the system of the electronic device. For example, by setting the themes corresponding to different festivals in the system of the electronic device, when the date jumps to a certain festival, the electronic device can receive the theme switching request triggered by the system.

In step 102, in response to the theme switching request, a theme of the first application is switched to the target theme, and a theme of a second application having an association relationship with the first application in the electronic device is switched to the target theme.

The second application refers to any application having the association relationship with the first application in the electronic device. In step 102, the electronic device, in response to the theme switching request for the first application, switches the themes of the first application and all applications having an association relationship with the first application in the electronic device to the target theme. In the embodiment of the present disclosure, the two applications have the association relationship, which means that the two applications have a theme-linked switching relationship. That is, if there is an association relationship between one application and the other application, when the theme of one application is switched, the theme of the other application can be triggered to be switched.

Optionally, the second application having the association relationship with the first application satisfies at least one of the following conditions: attribute information of the second application is related to attribute information of the first application, wherein attribute information of any application is configured to describe characteristics of the application; the second application is a preset application associated with the first application; and the second application and the first application satisfy: a pointing relationship from the first application to the second application.

The attribute information may include at least one of an identifier, a manufacturer, a content, and a function. If an overlap ratio of the identifiers of the two applications is higher than a certain threshold, it may indicate that the identifiers of the two applications are related. For example, the identifier of the application may be an application name or the like. If the manufacturers of the two applications are the same or friends, it may indicate that the manufacturers of the two applications are related. Related contents of the two applications may indicate that the two applications involve one or more of the same elements. For example, if one application is a fruit cutting game application, the other application is a fruit recognition application, both of the two applications involve the same element "fruit", it may be determined that the contents of the two applications are related. Related functions of the two applications may indicate that the two applications have one or more of the same functions. For example, if the two applications have instant messaging functions, it may be determined that the functions of the two applications are related.

In the embodiment of the present disclosure, which applications have an association relationship may be preset in the electronic device. For example, the plurality of applications having an association relationship may be configured with matching association identifiers. That is, if one application is configured with an association identifier, and the association identifier configured for the application matches the association identifier configured for the other application, it means that the two applications have the association relationship. The association identifiers match, specifically, the association identifiers may be the same, that is, the plurality of applications having the association relationship in the electronic device are configured with the same association identifier. Each association identifier may represent a group of association relationships, so the plurality of association identifiers can be configured to represent a plurality of groups of association relationships. For example, one or more association identifiers may be stored on the first application in the embodiment of the present disclosure. For example, association identifier 1 and association identifier 2 are stored on the first application. The association identifier 1 is configured to indicate the association relationship between the first application and the second application, and the association identifier 2 is configured to indicate the association relationship between the first application and another application other than the second application. It should be noted that the applications in the embodiment of the present disclosure refer to the applications in the same electronic device.

Optionally, a plurality of groups of association relationships may be preset in the electronic device, and the association identifiers corresponding to different groups of association relationships do not match each other. For example, application A and application B are configured with the association identifier 1, application C and application D are configured with the association identifier 2, then the association identifier 1 does not match the association identifier 2. The above means that the application A and the application B have an association relationship, the application C and the application D have an association relationship, and the application A and the application B have no association relationship with either the application C or the application D.

In the embodiment of the present disclosure, a pointing relationship from one application to the other application may be preset in the electronic device. The second application and the first application satisfy: the pointing relationship from the first application to the second application. That is, the association relationship is satisfied in a direction from the first application to the second application. That is, the second application may be triggered for theme switching during theme switching of the first application. If the second application and the first application also satisfy: the pointing relationship from the second application to the first application, it means that the association relationship between the first application and the second application is a two-way association relationship, that is, the second application may be triggered for theme switching during theme switching of the first application, and the first application may also be triggered for theme switching during theme switching of the second application. If the second application and the first application do not satisfy: the pointing relationship from the second application to the first application, it means that the association relationship between the first application and the second application is a one-way association relationship, that is, the second application may be triggered for theme switching during theme switching of the first application, but the first application cannot be triggered for theme switching during theme switching of the second application.

Optionally, the same application may be set in the plurality of groups of association relationships, and the plurality of groups of association relationships may be set to be isolated from each other or may also be set to affect each other. For example, the same application may be configured with a plurality of association identifiers, and different association identifiers are configured to indicate different types of association relationships. For example, both the application A and the application B are configured with association identifier a, which indicates that there is a two-way association relationship a between the application A and the application B. Both the application A and the application C are configured with association identifier b, which indicates that there is a one-way association relationship h from the application A to the application C between the application A and the application C. In this case, theme switching for the application A may trigger the theme switching for the application B and the application C. The theme switching for the application B may trigger the theme switching for the application A. If the two-way association relationship a and the one-way association relationship b affect each other, the application C will be further triggered for theme switching. If the two-way association relationship a and the one-way association relationship b are isolated from each other, then the application C will not be triggered for theme switching. In the embodiment of the present disclosure, the association relationships between respective applications may be flexibly set according to actual needs.

Optionally, the implementation of the above step 101 includes: receiving, by the electronic device, the theme switching request for the first application by the first application. Then, in step 102, the implementation of switching the theme of the first application to the target theme includes: switching, by the electronic device, the theme of the first application to the target theme by the first application based on the indication for the target theme. The implementation of switching the theme of the second application having the association relationship with the first application in the electronic device to the target theme includes: sending, by the electronic device, a theme switching message to the second application by the first application, the theme switching message including the indication for the target theme. The electronic device switches the theme of the second application to the target theme by the second application based on the indication for the target theme.

In an implementation, the first application sends the theme switching message to other applications (including the second application) having an association relationship with the first application. For example, a docking interface may be configured between the first application and the associated applications, and the first application may send the theme switching message to other applications associated with the first application by the docking interface.

In another implementation, the first application sends the theme switching message in a broadcast manner. For example, the first application may call a system where the first application is disposed to broadcast and send the theme switching message. In this way, the application running under the system where the first application is disposed in the electronic device can receive the theme switching message regardless of whether it is associated with the first application. In some embodiments, the first application may also send the theme switching message to other applications in a different system, which is not limited in the embodiment of the present disclosure.

In the implementation, after receiving the theme switching message from the first application, other applications firstly determine whether they have an association relationship with the first application. If there is an association relationship between other applications and the first application, theme switching is performed based on the theme switching message. If there is no association relationship between other applications and the first application, the theme switching message is ignored, that is, the theme switching is not performed.

Optionally, a first association identifier is configured in the first application, and a second association identifier is configured in the second application. The electronic device sends the theme switching message by the first application in a broadcast manner. The theme switching message includes the first association identifier and the indication for the target theme. In response to the second association identifier in the second application matching the first association identifier, the electronic device switches the theme of the second application to the target theme by the second application based on the indication for the target theme.

In the embodiment of the present disclosure, the association relationship between the first application and the second application in the electronic device is pre-established. When the first application receives the theme switching request, the second application and the first application are triggered to be simultaneously switched to the theme indicated by the theme switching request. It can be ensured that theme styles of the plurality of applications having the association relationship are consistent without a need for a user or system of the electronic device to perform additional operations. That is, a whole set of applications having the association relationship, namely family bucket applications can maintain a consistent theme style. In addition, a theme switching operation for only one application can realize theme switching for the plurality of applications in the same group, which enables the theme replacement to be more convenient and flexible.

Optionally, the implementation process of the above step 102 includes: acquiring, by the electronic device, a target theme color of the target theme based on the indication for the target theme. The electronic device performs theme switching on the first application and the second application respectively based on the target theme color.

If a third application associated with the first application does not run when the first application sends the theme switching message, then the third application cannot receive the theme switching message sent by the first application. In order to enable the third application to automatically replace the theme with the theme consistent with the first application when the third application runs, the embodiment of the present disclosure may also perform the following steps 103 to 105.

In step 103, in response to the theme switching request, the indication for the target theme is written in a target configuration file by the first application. The target configuration file is shared by the first application and other applications having an association relationship with the first application.

Optionally, a plurality of configuration files may be stored in the electronic device. Each configuration file is shared by the plurality of applications with the same association relationship. Each configuration file is configured to store basic information of the plurality of applications with the same association relationship, which includes current theme information of the plurality of applications, association information thereof with other applications and the like. The current theme information of the application may include an indication for the latest theme used by the application, which specifically may be an acquisition path of a theme resource of the latest theme used by the application. When the application writes the indication for the latest theme in the configuration file, the indication for the original theme may be overwritten.

Optionally, a timestamp may be set for the configuration file. If the timestamp of the configuration file changes, it indicates that the plurality of applications corresponding to the configuration file are subjected to theme switching. When an application having an association relationship with other applications starts to run, firstly whether the timestamp of the shared configuration file changes is detected. If the timestamp of the configuration file is detected to change, the indication for the latest theme is acquired from the configuration file for theme switching.

In step 104, in response to the third application having an association relationship with the first application running in the electronic device, the third application reads the indication for the target theme from the target configuration file.

In the embodiment of the present disclosure, the first application has an association relationship with the third application. When the first application sends the theme switching message, the third application does not run, so the third application cannot receive the theme switching message from the first application. After the first application writes the indication for the target theme in the target configuration file, the timestamp of the target configuration file will change. When the third application starts to run, it is detected that the timestamp of the target configuration file changes relative to the timestamp during running of the third application last time, then the third application reads the indication for the target theme from the target configuration file.

In step 105, the theme of the third application is switched to the target theme by the third application based on the indication for the target theme.

In the embodiment of the present disclosure, in response to the theme switching request, the first application writes the indication for the target theme in the target configuration file. During theme switching of the first application, the theme switching message sent by the first application is not received by the third application having the association relationship with the first application since the third application does not run. However, when starting to run, the third application may still acquire the indication for the target theme from the target configuration file, and the theme of the third application is switched to the target theme based on the indication for the target theme, so that the theme of the third application remains consistent with the theme of the first application in style. It can be ensured that theme styles of the plurality of applications having the association relationship are consistent without a need for a user or system of the electronic device to perform additional operations. In addition, a theme switching operation for only one application can realize theme switching for the plurality of applications in the same group, which enables the theme replacement to be more convenient and flexible.

In the embodiment of the present disclosure, during theme switching of the first application, the second application, and the third application, by taking over a management class of LayoutInflater.Factory processing resources, a theme package of resources to be replaced is generated. By AssetManager, resource files of the theme package are read out and handed over to LayoutInflater.Factory to reload new resources, thereby realizing the switching and updating of themes.

Optionally, the indication for the target theme may be an acquisition path of a theme resource of the target theme. The theme resource includes at least one of a theme color, a theme background, and a theme pattern. Switching the themes of the first application, the second application, and the third application to the target theme based on the indication for the target theme may be: switching an own theme color to a theme color of the target theme, switching an own theme background to a theme background of the target theme, and/or, switching an own theme pattern to a theme pattern of the target theme.

The theme resource usually exists in the form of a static resource file, and the theme color and other contents therein are fixed, which may cause a new theme to be incompatible with original content of the application after theme switching for the application. For example, the problem that since the text content on an application page is close to or even the same as the theme color, the text content is unclear, and the colors of texts, pictures, videos and other contents are incompatible with the theme color (for example, a contrast color difference) may occur. In view of this, the embodiment of the present disclosure provides a solution of adaptively adjusting the theme color based on the page content during theme switching of the application.

Optionally, in the above step 102, an implementation process of respectively performing theme switching on the first application and the second application by the electronic device based on the target theme color of the target theme includes:

The electronic device executes the following theme switching process on at least one of the first application and the second application: determining, by the electronic device, a theme matching color corresponding to an application page according to a contrast color of the application page of an application, the target theme color, and a preset color offset value corresponding to the application. The electronic device switches the theme color of the application page to the theme matching color. A value range of the preset color offset value is 0 to 1.

For example, the contrast color of the application page is M, the target theme color is N, and the preset color offset value is a, then the theme matching color N' corresponding to the application page may be expressed as: $N'=(1-\alpha)*M+\alpha*N$.

Optionally, the electronic device determines a first theme matching color corresponding to a first application page according to a contrast color of the first application page of the first application, the target theme color, and a preset first color offset value, and switches a theme color of the first application page to the first theme matching color. The first application page is any application page of the first application. The electronic device determines a second theme matching color corresponding to a second application page according to a contrast color of the second application page of the second application, the target theme color, and a preset second color offset value, and switches a theme color of the second application page to the second theme matching color. The second application page is any application page of the second application. The first color offset value and the second color offset value may be the same or different.

Optionally, the contrast color of the application page is a color occupying the largest display area in a display element on the application page. The display element may include at least one of a text, a picture, a video frame, and an icon. When there are a plurality of display elements on the application page, the contrast color of the application page may be acquired based on the plurality of display elements. For example, the color occupying the largest display area in the plurality of display elements on the application page may be used as the contrast color of the application page. Alternatively, the contrast color of the application page may also be acquired based on one of the plurality of display elements, for example, a main color of the display element with the largest display area in the display element on the application page may be used as the contrast color of the application page. The embodiment of the present disclosure does not limit an acquisition mode for the contrast color of the application page.

In the embodiment of the present disclosure, after acquiring the target theme color of the target theme, the electronic device may firstly determine whether the application page of the application (the first application or second application) to be subjected to theme switching needs to change the target theme color. For example, whether the application page of the application to be subjected to theme switching needs to change the target theme color to be switched may be determined according to a preset determination rule. The determination rule may include: if the color of the display element on the application page is similar to or the same as the target theme color, determining that the application page needs to change the target theme color to be switched. Then, after determining that the certain application page needs to change the target theme color to be switched, the electronic device determines the theme matching color corresponding to the application page according to a contrast color of the application page, the target theme color, and a preset color offset value color. Finally, the electronic device modifies the theme color of the application page to the theme matching color.

Figure 2:
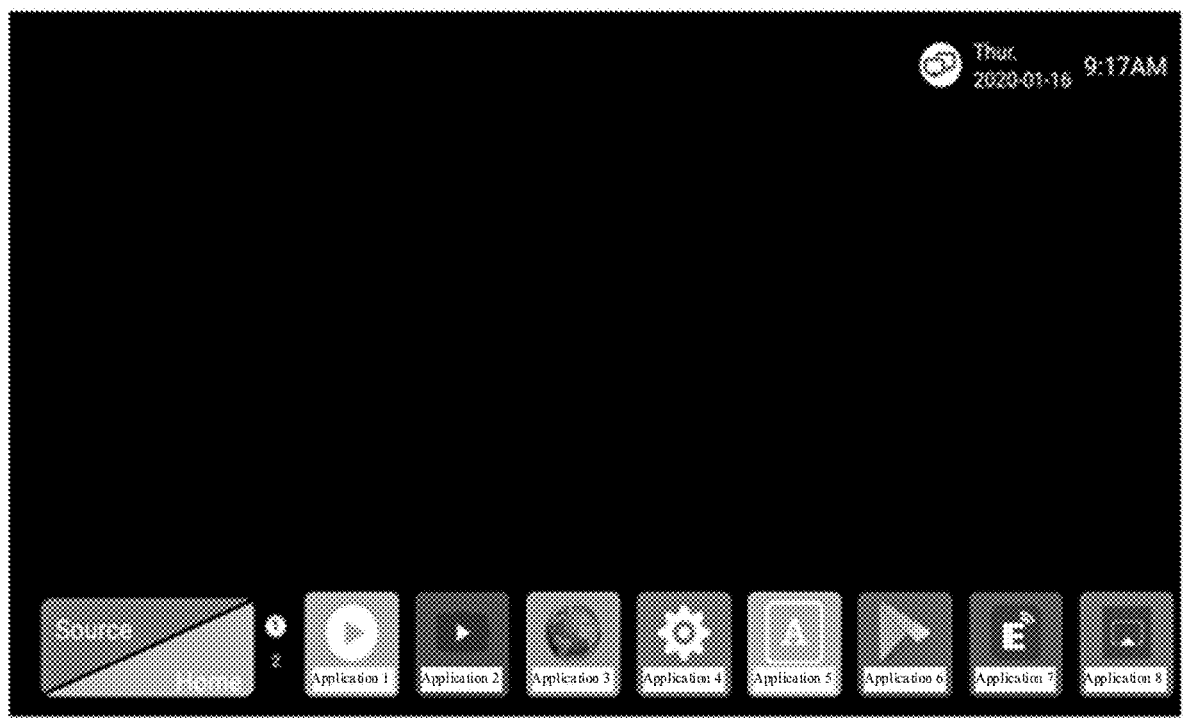
FIG. 2 is a display schematic diagram of an application page according to an embodiment of the present disclosure.

For example, FIG. 2 is a display schematic diagram of an application page according to an embodiment of the present disclosure. As shown in FIG. 2, the application page includes a plurality of shortcut icons. A background color is set off under each shortcut icon. The background color is a similar color based on a main color of the corresponding shortcut icon, and the background colors of different shortcut icons are usually different. If the theme color of the application page is similar to or the same as the background color of a certain shortcut icon, that is, a contrast color difference between the theme color and the background color of the shortcut is smaller, then the background color of the shortcut icon may not be distinguished from the theme color of the application page. As a result, a display effect of the shortcut icon on the application page is poor. In this case, compatibility of the theme color on the application page may be very poor. The problem can be well solved by calculating the main colors of the plurality of shortcut icons (namely the contrast color of the application page) and the theme color to obtain the theme matching color, and then modifying the theme color of the application page to the theme matching color.

In the embodiment of the present disclosure, the theme color of the theme to be switched is dynamically adjusted based on the contrast color of the application page. When an original theme color is close to the color of the display element on the application page, the theme color of the application page may be switched to the adjusted theme matching color, such that the display effect of the application page is better and the theme compatibility is better.

Figure 3:
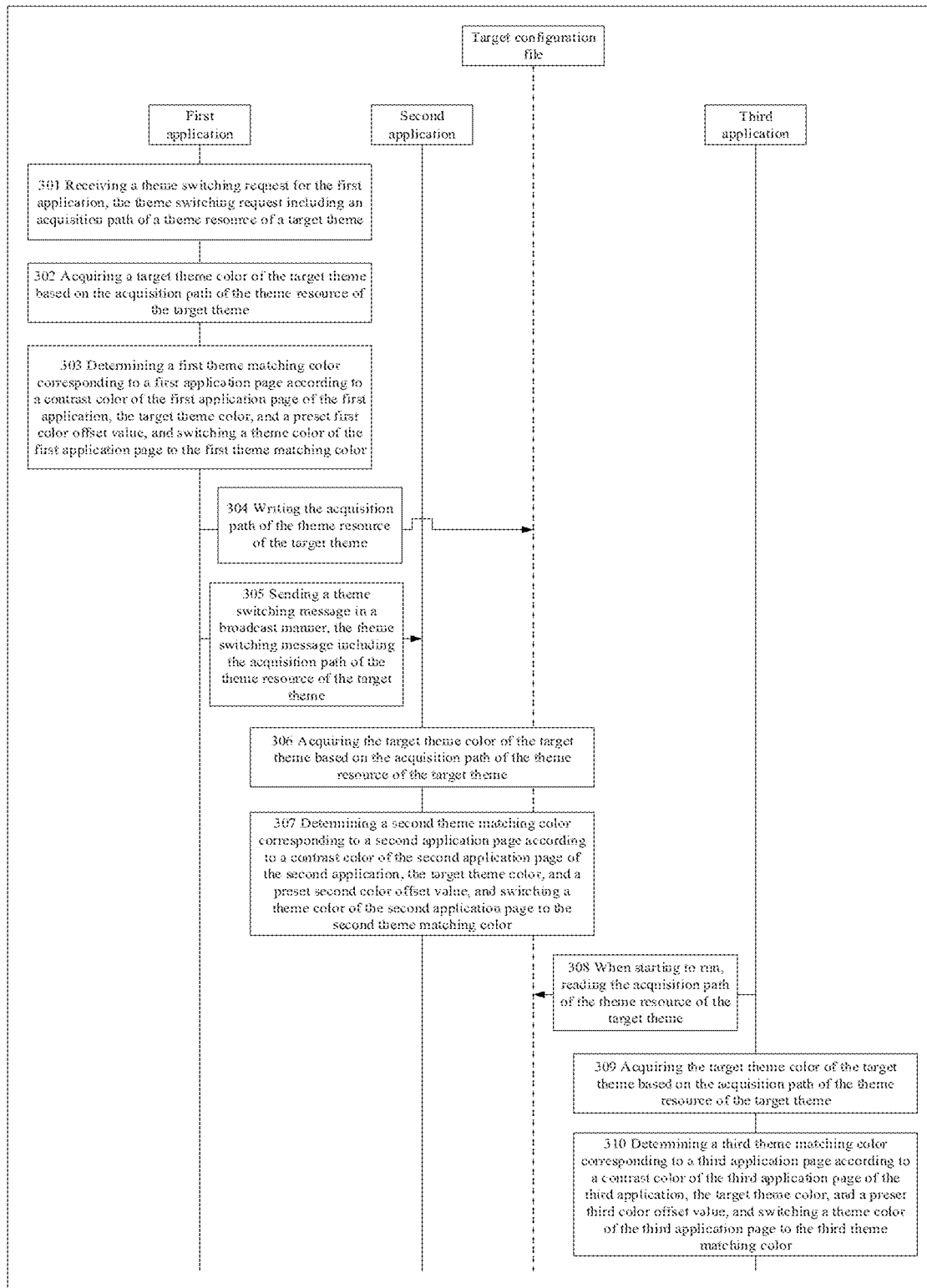
FIG. 3 is a schematic flowchart of another method for switching a theme of an application according to an embodiment of the present disclosure.

Optionally, in the embodiment of the present disclosure, the electronic device including the first application, the second application, and the third application which have an association relationship is taken as an example to illustrate the implementation process of the above method for switching the theme of the application. When the first application receives the theme switching request, the second application runs, and the third application does not run. FIG. 3 is a schematic flowchart of another method for switching a theme of an application according to an embodiment of the present disclosure. As shown in FIG. 3, the method includes the following working process.

In step 301, the first application receives a theme switching request for the first application, wherein the theme switching request includes an acquisition path of a theme resource of a target theme.

The theme resource includes a theme color.

In step 302, the first application acquires a target theme color of the target theme based on the acquisition path of the theme resource of the target theme.

In step 303, the first application determines a first theme matching color corresponding to a first application page according to a contrast color of the first application page of the first application, the target theme color, and a preset first color offset value, and switches a theme color of the first application page to the first theme matching color.

The first application page is any application page of the first application, and the contrast color of the first application page is a color occupying the largest display area in a display element on the first application page.

Optionally, the display element includes at least one of a text, a picture, a video frame, and an icon.

In step 304, the first application writes the acquisition path of the theme resource of the target theme in a target configuration file.

The target configuration profile is shared by the first application, the second application, and the third application.

In step 305, the first application sends a theme switching message in a broadcast manner, wherein the theme switching message includes the acquisition path of the theme resource of the target theme.

Since the second application runs and the third application does not run, the second application can receive the theme switching message, but the third application cannot receive the theme switching message.

In step 306, the second application acquires the target theme color of the target theme based on the acquisition path of the theme resource of the target theme.

In step 307, the second application determines a second theme matching color corresponding to a second application page according to a contrast color of the second application page of the second application, the target theme color, and a preset second color offset value, and switches a theme color of the second application page to the second theme matching color.

The second application page is any application page of the second application. The contrast color of the second application page is a color occupying the largest display area in a display element on the second application page.

In step 308, when the third application starts to run, the acquisition path of the theme resource of the target theme is read from the target configuration file.

In step 309, the third application acquires the target theme color of the target theme based on the acquisition path of the theme resource of the target theme.

In step 310, the third application determines a third theme matching color corresponding to a third application page according to a contrast color of the third application page of the third application, the target theme color, and a preset third color offset value, and switches a theme color of the third application page to the third theme matching color.

The third application page is any application page of the third application. The contrast color of the third application page is a color occupying the largest display area in a display element on the third application page.

It should be noted that the sequence of steps of the method for switching the theme of the application according to the embodiment of the present disclosure may be adjusted appropriately. For example, the above step 303, step 304, and step 305 may be performed simultaneously, or step 305 may be performed firstly, then step 304, and step 303 may be performed last, or, step 303 may be performed firstly, then step 304, and step 305 may be performed last. The steps may also be increased or decreased accordingly according to the situation. Various methods easily conceivable by those skilled in the art within the technical scope disclosed in the present disclosure should be covered by the scope of protection of the present disclosure, and will not be repeated here.

In summary, in the method for switching the theme of the application according to the embodiment of the present disclosure, the association relationship between the first application and the second application in the electronic device is established in advance. When the first application receives the theme switching request, the second application and the first application are triggered to be simultaneously switched to the theme indicated by the theme switching request. It can be ensured that theme styles of the plurality of applications having the association relationship are consistent without a need for a user or system of the electronic device to perform additional operations. That is, a whole set of applications having the association relationship, namely family bucket applications can maintain a consistent theme style. In addition, a theme switching operation for only one application can realize theme switching for the plurality of applications in the same group, which enables the theme replacement to be more convenient and flexible.

In addition, in response to the theme switching request, the first application can also write the indication for the target theme in the target configuration file. During theme switching of the first application, the theme switching message sent by the first application is not received by the third application having the association relationship with the first application because the third application does not run. However, when starting to run, the third application can still acquire the indication for the target theme from the target configuration file, and the theme of the third application is switched to the target theme based on the indication for the target theme, such that the theme of the third application is consistent with the theme style of the first application. It can be ensured that theme styles of the plurality of applications having the association relationship are consistent without a need for a user or system of the electronic device to perform additional operations.

In addition, in the embodiment of the present disclosure, the theme color of the theme to be switched can be dynamically adjusted based on the contrast color of the application page. When the original theme color is close to the color of a display element on the application page, the theme color of the application page can be switched to the adjusted theme matching color, such that the display effect of the application page is better and the theme compatibility is better.

The embodiment of the present disclosure provides an electronic device, including: a processor and a memory;

the memory is configured to store a computer program;

the processor is configured to execute the computer program;

wherein the computer program includes at least one program instruction for performing the following operations:

receiving a theme switching request for a first application in the electronic device, wherein the theme switching request includes an indication for a target theme; and switching, in response to the theme switching request, a theme of the first application to the target theme, and a theme of a second application having an association relationship with the first application in the electronic device to the target theme.

Optionally, the second application having the association relationship with the first application satisfies at least one of the following conditions:

attribute information of the second application is related to attribute information of the first application, wherein attribute information of any application is configured to describe characteristics of the any application; the second application is a preset application associated with the first application; and the second application and the first application satisfy: a pointing relationship from the first application to the second application.

Optionally, the computer program specifically includes at least one instruction for performing the following operations:

receiving the theme switching request for the first application by the first application; switching, in response to the theme switching request, the theme of the first application to the target theme by the first application based on the indication for the target theme; sending, in response to the theme switching request, a theme switching message to the second application by the first application, wherein the theme switching message includes the indication for the target theme; and switching the theme of the second application to the target theme by the second application based on the indication for the target theme.

Optionally, the computer program further includes at least one instruction for performing the following operation:

writing, in response to the theme switching request, the indication for the target theme in a target configuration file by the first application, wherein the target configuration file is shared by the first application and other applications having an association relationship with the first application.

Optionally, the computer program further includes at least one instruction for performing the following operations:

reading, in response to a third application having an association relationship with the first application running in the electronic device, the indication for the target theme from the target configuration file by the third application; and switching a theme of the third application to the target theme by the third application based on the indication for the target theme.

Figure 4:
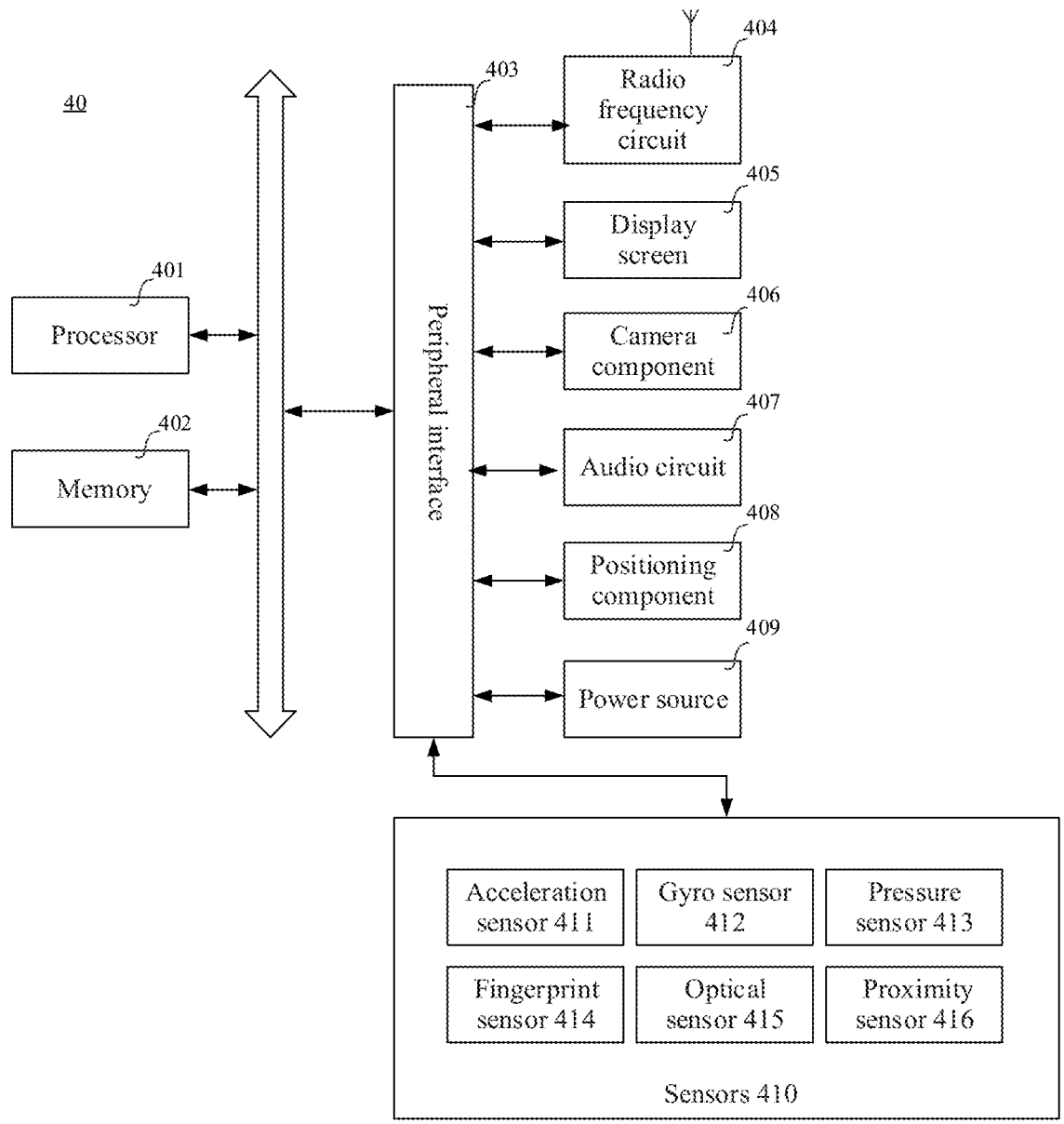
FIG. 4 is a block diagram of an electronic device according to an embodiment of the present disclosure.

For example, FIG. 4 is a block diagram of an electronic device according to an embodiment of the present disclosure. The electronic device 40 may be a portable mobile terminal, such as a smart phone, a tablet computer, a moving picture experts group audio layer III (MP3) player, a moving picture experts group audio layer IV (MP4) player; a laptop or desk computer. The electronic device 40 may also be called user equipment (UE), a portable terminal, a laptop terminal, a desk terminal, or other names.

Generally, the electronic device 40 includes a processor 401 and a memory 402.

The processor 401 may include one or more processing cores, such as a 4-core processor and an 8-core processor. The processor 401 may be formed by at least one hardware of a digital signal processing (DSP), a field-programmable gate array (FPGA), and a programmable logic array (PLA). The processor 401 may also include a main processor and a coprocessor. The main processor is a processor for processing the data in an awake state, and is also called a central processing unit (CPU). The coprocessor is a low-power-consumption processor for processing the data in a standby state. In some embodiments, the processor 401 may be integrated with a graphics processing unit (GPU), which is configured to render and draw the content that needs to be displayed by a display screen. In some embodiments, the processor 401 may also include an artificial intelligence (AI) processor configured to process computational operations related to machine learning.

The memory 402 may include one or more computer-readable storage mediums, which may be non-transitory. The memory 402 may also include a high-speed random access memory, as well as a non-volatile memory, such as one or more disk storage devices and flash storage devices. In some embodiments, the non-transitory computer-readable storage medium in the memory 402 is configured to store at least one instruction. The at least one instruction is configured to be executed by the processor 401 to perform the method for switching the theme of the application according to the method embodiments of the present disclosure.

In some embodiments, the electronic device 40 also optionally includes a peripheral interface 403 and at least one peripheral device. The processor 401, the memory 402, and the peripheral interface 403 may be connected by a bus or a signal line. Each peripheral device may be connected to the peripheral interface 403 by a bus, a signal line or a circuit board. Specifically, the peripheral device includes at least one of a radio frequency circuit 404, a display screen 405, a camera 406, an audio circuit 407, a positioning component 408, and a power source 409.

The peripheral interface 403 may be configured to connect at least one peripheral device associated with an input/output (I/O) to the processor 401 and the memory 402. In some embodiments, the processor 401, the memory 402, and the peripheral interface 403 are integrated on the same chip or circuit board. In some other embodiments, any one or two of the processor 401, the memory 402, and the peripheral interface 403 may be implemented on a separate chip or circuit board, which is not limited in the embodiment of the present disclosure.

The radio frequency circuit 404 is configured to receive and transmit a radio frequency (RI) signal, which is also referred to as an electromagnetic signal. The radio frequency circuit 404 communicates with a communication network and other communication devices via the electromagnetic signal. The radio frequency circuit 404 converts the electrical signal into the electromagnetic signal for transmission, or converts the received electromagnetic signal into the electrical signal. Optionally, the radio frequency circuit 404 includes an antenna system, an RF transceiver, one or more amplifiers, a tuner, an oscillator, a digital signal processor, a codec chipset, a subscriber identity module card, and the like. The radio frequency circuit 404 may communicate with other terminals via at least one wireless communication protocol. The wireless communication protocol includes, but not limited to, the World Wide Web, a metropolitan area network, an intranet, various generations of mobile communication networks (2G, 3G, 4G, and 5G), a wireless local area network, and/or a wireless fidelity (Wi-Fi) network. In some embodiments, the RF circuit 404 may also include near field communication (NFC) related circuits, which is not limited in the present disclosure.

The display screen 405 is configured to display a user interface (UI). The may include graphics, text, icons, videos, and any combination thereof. When the display screen 405 is a touch display screen, the display screen 405 also has the capacity to acquire touch signals on or over the surface of the display screen 405. The touch signal may be input into the processor 401 as a control signal for processing. At this time, the display screen 405 may also be configured to provide virtual buttons and/or virtual keyboards, which are also referred to as soft buttons and/or soft keyboards. In some embodiments, one display screen 405 may be disposed on the front panel of the electronic device 40. In some other embodiments, at least two display screens 405 may be disposed respectively on different surfaces of the electronic device 40 or in a folded design. In further embodiments, the display screen 405 may be a flexible display screen disposed on the curved or folded surface of the electronic device 40, Even the display screen 405 may also be set in an irregular shape other than a rectangle, that is, the display screen 405 may be an irregular-shaped screen. The display screen 405 may be an organic light-emitting diode (OLED) display screen.

The camera component 406 is configured to capture images or videos. Optionally, the camera component 406 includes a front camera and a rear camera, Usually, the front camera is disposed on the front panel of the terminal, and the rear camera is disposed on the back of the terminal. In some embodiments, at least two rear cameras are disposed, and are at least one of a main camera, a depth-of-field camera, a wide-angle camera, and a telephoto camera respectively, so as to realize a background blurring function achieved by fusion of the main camera and the depth-of-field camera, panoramic shooting and virtual reality (VR) shooting functions achieved by fusion of the main camera and the wide-angle camera or other fusion shooting functions. In some embodiments, the camera component 406 may also include a flashlight. The flashlight may be a mono-color temperature flashlight or a two-color temperature flashlight. The two-color temperature flash is a combination of a warm flashlight and a cold flashlight and can be used for light compensation at different color temperatures.

The audio circuit 407 may include a microphone and a speaker. The microphone is configured to collect sound waves of users and environments, and convert the sound waves into electrical signals which are input into the processor 401 for processing, or input into the RE circuit 404 for voice communication. For the purpose of stereo acquisition or noise reduction, there may be a plurality of microphones respectively disposed at different locations of the electronic device 40, The microphone may also be an array microphone or an omnidirectional acquisition microphone. The speaker is then configured to convert the electrical signals from the processor 401 or the radio frequency circuit 404 into the sound waves. The speaker may be a conventional film speaker or a piezoelectric ceramic speaker. When the speaker is the piezoelectric ceramic speaker, the electrical signal can be converted into not only human-audible sound waves but also the sound waves which are inaudible to humans for the purpose of ranging and the like. In some embodiments, the audio circuit 407 may also include a headphone jack.

The positioning component 408 is configured to locate the current geographic location of the electronic device 40 to implement navigation or location based service (LBS). The positioning component 408 may be a positioning component based on the American global positioning system (GPS), the Chinese Beidou system, or the European Galileo system.

The power source 409 is configured to power up various components in the electronic device 40. The power source 409 may be alternating current, direct current, a disposable battery, or a rechargeable battery. When the power source 409 includes the rechargeable battery, the rechargeable battery may a wired rechargeable battery or a wireless rechargeable battery. The wired rechargeable battery is a battery charged by a cable line, and wireless rechargeable battery is charged by a wireless coil. The rechargeable battery may also support the fast charging technology.

In some embodiments, the electronic device 40 also includes one or more sensors 410. The one or more sensors 410 include, but not limited to, an acceleration sensor 44, a gyro sensor 412, a pressure sensor 413, a fingerprint sensor 414, an optical sensor 415, and a proximity sensor 416.

The acceleration sensor 44 may detect magnitudes of accelerations on three coordinate axes of a coordinate system established by the electronic device 40. For example, the acceleration sensor 44 may be configured to detect components of a gravitational acceleration on the three coordinate axes. The processor 401 may control the display screen 405 to display a user interface in a landscape view or a portrait view according to a gravity acceleration signal collected by the acceleration sensor 44. The acceleration sensor 44 may also be configured to collect motion data of a game or a user.

The gyro sensor 412 may detect a body direction and a rotation angle of the electronic device 40, and may cooperate with the acceleration sensor 44 to collect a 31) motion of the user on the electronic device 40. Based on the data collected by the gyro sensor 412, the processor 401 may serve the following functions: motion sensing (such as changing the according to a user's tilt operation), image stabilization during shooting, game control, and inertial navigation.

The pressure sensor 413 may be disposed on a side frame of the electronic device 40 and/or a lower layer of the display screen 405. When the pressure sensor 413 is disposed on the side frame of the electronic device 40, a user's holding signal to the electronic device 40 may, be detected. The processor 401 can perform left-right hand recognition or quick operation according to the holding signal collected by the pressure sensor 413. When the pressure sensor 413 is disposed on the lower layer of the display screen 405, the processor 401 controls an operable control on the UI according to a user's pressure operation on the touch display screen 405. The operable control includes at least one of a button control, a scroll bar control, an icon control, and a menu control.

The fingerprint sensor 414 is configured to collect a user's fingerprint. The processor 401 identifies the user's identity based on the fingerprint collected by the fingerprint sensor 414, or the fingerprint sensor 414 identifies the user's identity based on the collected fingerprint. When the user's identity is identified as trusted, the processor 401 authorizes the user to perform related sensitive operations, such as unlocking the screen, viewing encrypted information, downloading software, paying, and changing settings. The fingerprint sensor 414 may be provided on the front, back, or side of the electronic device 40. When the electronic device 40 is provided with a physical button or a manufacturer's Logo, the fingerprint sensor 414 may be integrated with the physical button or the manufacturer's Logo.

The optical sensor 415 is configured to collect ambient light intensity. In one embodiment, the processor 401 may control the display brightness of the display screen 405 according to the ambient light intensity collected by the optical sensor 415. Specifically, when the ambient light intensity is high, the display brightness of the display screen 405 is increased; and when the ambient light intensity is low, the display brightness of the display screen 405 is decreased. In another embodiment, the processor 401 may also dynamically adjust shooting parameters of the camera component 406 according to the ambient light intensity collected by, the optical sensor 415.

The proximity sensor 416, also referred to as a distance sensor, is usually disposed on the front panel of the electronic device 40. The proximity sensor 416 is configured to capture a distance between the user and a front surface of the electronic device 40. In one embodiment, when the proximity sensor 416 detects that the distance between the user and the front surface of the electronic device 40 becomes gradually smaller, the processor 401 controls the touch display screen 405 to switch from a screen-on state to a screen-off state. When it is detected that the distance between the user and the front surface of the electronic device 40 gradually increases, the processor 401 controls the touch display screen 405 to switch from the screen-off state to the screen-on state.

It will be understood by those skilled in the art that the structure shown in FIG. 4 does not constitute a limitation to the electronic device 40, and may include more or less components than those illustrated, or combine some components, or adopt different component arrangements.

The embodiment of the present disclosure also provides a non-transitory computer-readable storage medium storing at least one instruction. When the at least one instruction is executed by a processor of an electronic device, the method for switching the theme of the application according to the above method embodiments is performed, and includes the following working process:

receiving a theme switching request for a first application in the electronic device, wherein the theme switching request includes an indication for a target theme; and switching, in response to the theme switching request, a theme of the first application to the target theme, and a theme of a second application having an association relationship with the first application in the electronic device to the target theme.

Figure 5:
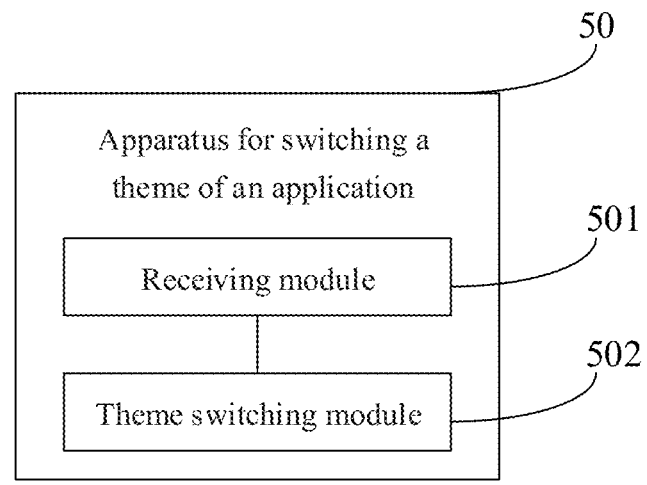
FIG. 5 is a schematic structural diagram of an apparatus for switching a theme of an application according to an embodiment of the present disclosure.

FIG. 5 is a schematic structural diagram of an apparatus for switching a theme of an application according to an embodiment of the present disclosure. The apparatus 50 is applicable to an electronic device. As shown in FIG. 5, the apparatus 50 includes:

a receiving module 501 configured to receive a theme switching request for a first application in the electronic device, wherein the theme switching request includes an indication for a target theme; and a theme switching module 502 configured to switch, in response to the theme switching request, a theme of the first application to the target theme, and a theme of a second application having an association relationship with the first application in the electronic device to the target theme.

Optionally, the second application having the association relationship with the first application satisfies at least one of the following conditions:

attribute information of the second application is related to attribute information of the first application, wherein attribute information of any application is configured to describe characteristics of the any application;

the second application is a preset application associated with the first application; and the second application and the first application satisfy: a pointing relationship from the first application to the second application.

Optionally, the attribute information includes at least one of an identifier, a manufacturer, a content, and a function.

Optionally, the receiving module 501 is configured to receive the theme switching request for the first application by the first application. The theme switching module 502 is configured to switch the theme of the first application to the target theme by the first application based on the indication for the target theme; send a theme switching message to the second application by the first application, wherein the theme switching message includes the indication for the target theme; and switch the theme of the second application to the target theme by the second application based on the indication for the target theme.

Optionally, a first association identifier is configured in the first application, and a second association identifier is configured in the second application; the theme switching module 502 is configured to send the theme switching message by the first application in a broadcast manner, wherein the theme switching message further includes the first association identifier; and switch, in response to the second association identifier matching the first association identifier, the theme of the second application to the target theme by the second application based on the indication for the target theme.

Figure 6:
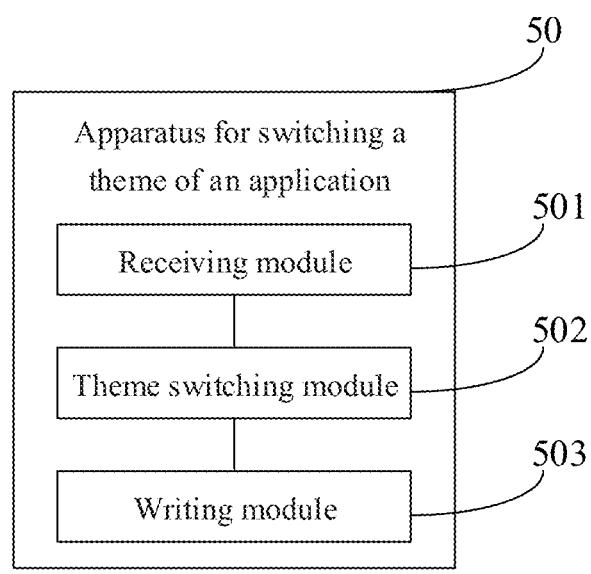
FIG. 6 is a schematic structural diagram of another apparatus for switching a theme of an application according to an embodiment of the present disclosure.

Optionally, as shown in FIG. 6, the apparatus 50 further includes:

a writing module 503 configured to write, in response to the theme switching request, the indication for the target theme in a target configuration file by the first application, wherein the target configuration file is shared by the first application and other applications having an association relationship with the first application.

Figure 7:
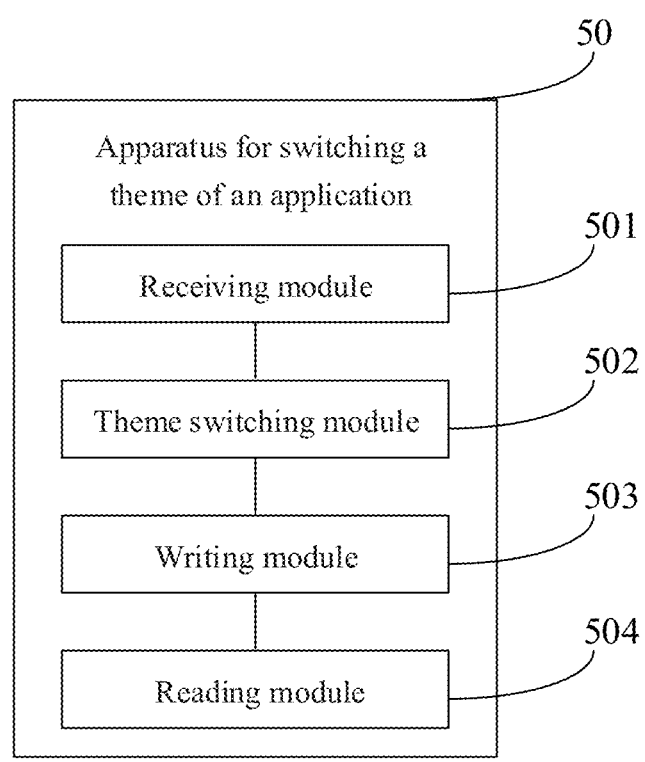
FIG. 7 is a schematic structural diagram of yet another apparatus for switching a theme of an application according to an embodiment of the present disclosure.

Optionally, as shown in FIG. 7, the apparatus 50 further includes:

a reading module 504 configured to read, in response to a third application having an association relationship with the first application running in the electronic device, the indication for the target theme from the target configuration file by the third application; and the theme switching module 502 is configured to switch a theme of the third application to the target theme by the third application based on the indication for the target theme.

Optionally, the theme switching module 502 is configured to:

acquire a target theme color of the target theme based on the indication for the target theme; and switch themes of the first application and the second application based on the target theme color.

Optionally, the theme switching module 502 is configured to perform the following theme switching process on at least one of the first application and the second application:

determining a theme matching color corresponding to an application page according to a contrast color of the application page of an application, the target theme color, and a preset color offset value corresponding to the application; and switching a theme color of the application page to the theme matching color.

Optionally, the contrast color of the application page is a color occupying the largest display area in a display element on the application page.

Optionally, the display element includes at least one of a text, a picture, a video frame, and an icon.

Optionally, the indication for the target theme includes an acquisition path of a theme resource of the target theme.

Optionally, the theme resource includes at least one of a theme color, a theme background, and a theme pattern.

Optionally, the indication for the target theme includes the acquisition path of the theme resource of the target theme; the theme switching module 502 is configured to:

acquire the target theme color of the target theme by the first application based on the acquisition path of the theme resource of the target theme, and determine a first theme matching color corresponding to a first application page by the first application according to a contrast color of the first application page of the first application, the target theme color, and a preset first color offset value, and switch a theme color of the first application page to the first theme matching color, wherein the first application page is any application page of the first application, and the contrast color of the first application page is a color occupying the largest display area in a display element on the first application page; and acquire the target theme color of the target theme by the second application based on the acquisition path of the theme resource of the target theme, and determine a second theme matching color corresponding to a second application page by the second application according to a contrast color of the second application page of the second application, the target theme color, and a preset second color offset value, and switch a theme color of the second application page to the second theme matching color, wherein the second application page is any application page of the second application, and the contrast color of the second application page is a color occupying the largest display area in a display element on the second application page;

wherein the display element includes at least one of a text, a picture, a video frame, and an icon.

Regarding the apparatus in the foregoing embodiment, the specific manner in which each module performs operation has been described in detail in the method embodiments, and will not be described in detail here.

Through the descriptions of the above implementations, those skilled in the art may clearly understand that, for the convenience and conciseness of the descriptions, division of all the above functional modules is only taken as an example for illustration. In practice, the above functions can be finished by the different functional modules as required. That is, the internal structure of the apparatus is divided into different functional modules to finish all or part of the functions described above. As to the specific working processes of the system, apparatus and units described above, reference may be made to the corresponding processes in the foregoing method embodiments, and details are not described herein again.

It may be understood that for implementing the above functions, the electronic device includes corresponding hardware structures and/or software modules for executing various functions. Those skilled in the art should realize that respective exemplary units and algorithm steps described in combination with the embodiments disclosed in the present disclosure may be implemented as hardware or a combination of hardware and computer software by the embodiments of the present disclosure. Whether certain function is implemented in the manner of hardware or in the manner that computer software drives the hardware depends on particular applications and design constraints of the technical solutions. Those skilled in the art may implement the described functions with different methods for each of particular applications, but such implementation shall not be regarded as going beyond the scope of the embodiments of the present disclosure.

The embodiments of the present disclosure may perform division of the functional modules on the above electronic device according to the above method examples. For example, the functional modules may be divided corresponding to each function, or two or more functions may be integrated into one processing module. The above integrated modules may be implemented in the form of hardware or software functional modules. It should be noted that the division of the modules in the embodiments of the present disclosure is illustrative, and is only a logical function division, and there may be other division modes in actual implementation.

The functional units in respective embodiments of the present disclosure may be integrated into one processing unit. Or, each unit exists physically independently. Or, two or more units may be integrated into one unit. The above integrated units may be implemented in the form of hardware or a software functional unit.

The integrated units, if implemented in the form of the software functional unit and sold or used as a standalone product, may be stored in a computer-readable storage medium. Based on such understanding, the technical solution of the embodiments of the present disclosure in essence, or a part that contributes to the related art, or all or part of the technical solution, may be embodied in the form of a software product. The computer software product is stored in a storage medium and includes a plurality of instructions for a computer device (which may be a personal computer, a server, a network device or the like) or a processor to execute all or part of the steps of the method described in respective embodiments of the present disclosure. The foregoing storage medium includes a flash memory, a mobile hard disk, a read-only memory, a random access memory, a magnetic disk, an optical disk other various mediums that may store program codes.

Obviously, the above embodiments of the present disclosure are merely examples to clearly illustrate the present disclosure, and are not intended to limit the implementations of the present disclosure. For those of ordinary skilled in the art, on the basis of the above illustration, other different forms of changes or variations can also be made, and it is not possible to list all the implementations here. Any obvious changes or variations derived from the technical solutions of the present disclosure are still within the scope of protection of the present disclosure.

What is claimed is:

1. A method for switching a theme of an application, applicable to an electronic device, wherein the electronic device comprises a first application configured with a first association identifier and a second application configured with a second association identifier, and the method comprises:
   receiving, by the first application, a theme switching request for the first application, wherein the theme switching request comprises an indication for a target theme;
   switching, by the first application, a theme of the first application to the target theme in response to the theme switching request and based on the indication for the target theme;
   sending, by the first application, a theme switching message in a broadcast manner, wherein the theme switching message comprises the first association identifier; and
   switching, by the second application, a theme of the second application to the target theme in response to the second association identifier matching the first association identifier and based on the indication for the target theme.

2. The method according to claim 1, further comprising:
   writing, in response to the theme switching request, the indication for the target theme in a target configuration file by the first application, wherein the target configuration file is shared by the first application and other applications having an association relationship with the first application.

3. The method according to claim 2, wherein after writing the indication for the target theme in the target configuration file by the first application, the method further comprises:
   reading, in response to a third application having an association relationship with the first application running in the electronic device, the indication for the target theme from the target configuration file by the third application; and
   switching a theme of the third application to the target theme by the third application based on the indication for the target theme.

4. The method according to claim 1, wherein switching the theme of the first application and the theme of the second application to the target theme based on the indication for the target theme comprises:
   acquiring a target theme color of the target theme based on the indication for the target theme; and
   switching themes of the first application and the second application based on the target theme color.

5. The method according to claim 4, wherein switching the themes of the first application and the second application based on the target theme color comprises:
   performing the following theme switching process on at least one of the first application and the second application:
   determining a theme matching color corresponding to an application page according to a contrast color of the application page of an application, the target theme color, and a preset color offset value corresponding to the application; and
   switching a theme color of the application page to the theme matching color.

6. The method according to claim 5, wherein the contrast color of the application page is a color occupying the largest display area in a display element on the application page.

7. The method according to claim 6, wherein the display element comprises at least one of a text, a picture, a video frame, and an icon.

8. The method according to claim 1, wherein the indication for the target theme comprises an acquisition path of a theme resource of the target theme.

9. The method according to claim 8, wherein the theme resource comprises at least one of a theme color, a theme background, and a theme pattern.

10. The method according to claim 3, wherein the indication for the target theme comprises an acquisition path of a theme resource of the target theme;
    switching, by the first application, the theme of the first application to the target theme based on the indication for the target theme comprises: acquiring a target theme color of the target theme by the first application based on the acquisition path of the theme resource of the target theme, determining a first theme matching color corresponding to a first application page by the first application according to a contrast color of the first application page of the first application, the target theme color, and a preset first color offset value, and switching a theme color of the first application page to the first theme matching color, wherein the first application page is any application page of the first application, and the contrast color of the first application page is a color occupying the largest display area in a display element on the first application page; and
    switching, by the second application, the theme of the second application to the target theme based on the indication for the target theme comprises: acquiring a target theme color of the target theme by the second application based on the acquisition path of the theme resource of the target theme, determining a second theme matching color corresponding to a second application page by the second application according to a contrast color of the second application page of the second application, the target theme color, and a preset second color offset value, and switching a theme color of the second application page to the second theme matching color, wherein the second application page is any application page of the second application, and the contrast color of the second application page is a color occupying the largest display area in a display element on the second application page;
    wherein the display element comprises at least one of a text, a picture, a video frame, and an icon.

11. An electronic device, wherein the electronic device comprises a first application configured with a first association identifier and a second application configured with a second association identifier, and the electronic device comprises:
    a processor; and
    a memory for storing a computer program executable by the processor,
    wherein the computer program comprises a program instruction for performing the following operations:
    receiving, by the first application, a theme switching request for the first application, wherein the theme switching request comprises an indication for a target theme;

switching, by the first application, a theme of the first application to the target theme in response to the theme switching request and based on the indication for the target theme;

sending, by the first application, a theme switching message in a broadcast manner, wherein the theme switching message comprises the first association identifier; and switching, by the second application, a theme of the second application to the target theme in response to the second association identifier matching the first association identifier and based on the indication for the target theme.

12. The electronic device according to claim 11, wherein the computer program further comprises an instruction for performing the following operation:

writing, in response to the theme switching request, the indication for the target theme in a target configuration file by the first application, wherein the target configuration file is shared by the first application and other applications having an association relationship with the first application.

13. The electronic device according to claim 12, wherein the computer program further comprises an instruction for performing the following operations:

reading, in response to a third application having an association relationship with the first application running in the electronic device, the indication for the target theme from the target configuration file by the third application; and switching a theme of the third application to the target theme by the third application based on the indication for the target theme.

14. A non-transitory computer-readable storage medium storing an instruction thereon, wherein when the instruction is executed by a processor of an electronic device comprising a first application configured with a first association identifier and a second application configured with a second association identifier, following working process is implemented:

receiving, by the first application, a theme switching request for the first application, wherein the theme switching request comprises an indication for a target theme;

switching, by the first application, a theme of the first application to the target theme in response to the theme switching request and based on the indication for the target theme;

sending, by the first application, the a theme switching message in a broadcast manner, wherein the theme switching message comprises the first association identifier; and switching, by a second application, a theme of the second application to the target theme in response to the second association identifier matching the first association identifier and based on the indication for the target theme.

* * * * *